(12) United States Patent
Ahn et al.

(10) Patent No.: US 10,524,239 B2
(45) Date of Patent: Dec. 31, 2019

(54) METHOD AND APPARATUS FOR TRANSMITTING DATA IN UNLICENSED BAND

(71) Applicant: LG ELECTRONICS INC., Seoul (KR)

(72) Inventors: Joonkui Ahn, Seoul (KR); Hanjun Park, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,144

(22) PCT Filed: Aug. 12, 2016

(86) PCT No.: PCT/KR2016/008872
§ 371 (c)(1),
(2) Date: Feb. 7, 2018

(87) PCT Pub. No.: WO2017/026832
PCT Pub. Date: Feb. 16, 2017

(65) Prior Publication Data
US 2018/0234965 A1    Aug. 16, 2018

Related U.S. Application Data

(60) Provisional application No. 62/204,450, filed on Aug. 13, 2015, provisional application No. 62/251,695, (Continued)

(51) Int. Cl.
*H04W 72/04*    (2009.01)
*H04W 74/08*    (2009.01)
*H04W 16/14*    (2009.01)

(52) U.S. Cl.
CPC ... *H04W 72/0413* (2013.01); *H04W 74/0816* (2013.01); *H04W 16/14* (2013.01); *H04W 72/0446* (2013.01)

(58) Field of Classification Search
None
See application file for complete search history.

(56) References Cited

U.S. PATENT DOCUMENTS

2009/0129353 A1    5/2009  Ki et al.
2014/0342745 A1*  11/2014  Bhushan ........... H04W 28/0289
                                                        455/450
(Continued)

FOREIGN PATENT DOCUMENTS

WO    2013115629    8/2013
WO    2013122424    8/2013

OTHER PUBLICATIONS

PCT International Application No. PCT/KR2016/008872, International Search Report dated Nov. 3, 2016, 2 pages.
(Continued)

*Primary Examiner* — Lonnie V Sweet
(74) *Attorney, Agent, or Firm* — Lee, Hong, Degerman, Kang & Waimey PC

(57) ABSTRACT

Provided are a method and an apparatus for transmitting data in an unlicensed band. The apparatus determines whether a wireless medium is idle by performing a clear channel assessment (CCA) during a plurality of continuous CCA slots in the unlicensed band. When the wireless medium is idle, the apparatus transmits a reservation signal to occupy the wireless medium during a plurality of continuous reservation slots until transmission of a data burst begins.

6 Claims, 5 Drawing Sheets

Related U.S. Application Data filed on Nov. 6, 2015, provisional application No. 62/257,017, filed on Nov. 18, 2015, provisional application No. 62/290,970, filed on Feb. 4, 2016, provisional application No. 62/313,819, filed on Mar. 28, 2016.

(56) References Cited

U.S. PATENT DOCUMENTS

| | | |
|---|---|---|
| 2014/0362780 A1 | 12/2014 | Malladi et al. |
| 2015/0110066 A1 | 4/2015 | Gaal et al. |
| 2015/0117369 A1* | 4/2015 | Merlin .............. H04W 72/0446 370/329 |
| 2016/0262023 A1* | 9/2016 | Hiertz ................. H04W 74/006 |
| 2019/0028248 A1* | 1/2019 | Baldemair ............ H04L 5/0023 |

OTHER PUBLICATIONS

Ericsson, "Further details on LBT for LAA", R1-150584, 3GPP TSG RAN WG1 Meeting #80, Feb. 2015, 6 pages.

3rd Generation Partnership Project; Technical Specification Group Radio Access Network; Study on Licensed-Assisted Access to Unlicensed Spectrum; (Release 13), 3GPP TR 36.889 V1.0.1, Jun. 2015, 3 pages.

3rd Generation Partnership Project; Technical Specification Group Radio Access Network; Evolved Universal Terrestrial Radio Access (E-UTRA); Physical Channels and Modulation (Release 10), Section 5.5 of 3GPP TS 36.211 V10.5.0, Jun. 2012, 18 pages.

European Patent Office Application Serial No. 16835472.8, Search Report dated Feb. 11, 2019, 10 pages.

ZTE, "On Reservation Signal", 3GPP TSG RAN WG1 Meeting #80, R1-150155, Feb. 2015, 6 pages.

* cited by examiner

METHOD AND APPARATUS FOR TRANSMITTING DATA IN UNLICENSED BAND

CROSS-REFERENCE TO RELATED APPLICATIONS

This application is the National Stage filing under 35 U.S.C. 371 of International Application No. PCT/KR2016/008872, filed on Aug. 12, 2016, which claims the benefit of U.S. Provisional Applications No. 62/204,450, filed on Aug. 13, 2015, 62/251,695, filed on Nov. 6, 2015, 62/257,017, filed on Nov. 18, 2015, 62/290,970, filed on Feb. 4, 2016 and 62/313,819 filed on Mar. 28, 2016, the contents of which are all hereby incorporated by reference herein in their entirety.

BACKGROUND OF THE INVENTION

Field of the Invention

The present invention relates to wireless communication, and more particularly, to a method of transmitting data in an unlicensed band, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides a method for transmitting data in an unlicensed band and a device using the method.

In an aspect, a method for transmitting data in an unlicensed band includes determining, by a wireless device, whether a wireless medium is idle by performing a clear channel assessment (CCA) during a plurality of consecutive CCA slots in the unlicensed band, and, when the wireless medium is idle, transmitting, by the wireless device, a reservation signal to occupy the wireless medium during a plurality of consecutive reservation slots until a transmission of a data burst starts. A length of one reservation slot is equal to or less than a length of one CCA slot.

In another aspect, a device for transmitting data in an unlicensed band includes a transceiver configured to transmit and receive a radio signal, and a processor coupled to the transceiver. The processor is configured to determine whether a wireless medium is idle by performing a clear channel assessment (CCA) during a plurality of consecutive CCA slots in the unlicensed band, and transmit a reservation signal to occupy the wireless medium during a plurality of consecutive reservation slots until a transmission of a data burst starts when the wireless medium is idle. A length of one reservation slot is equal to or less than a length of one CCA slot.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
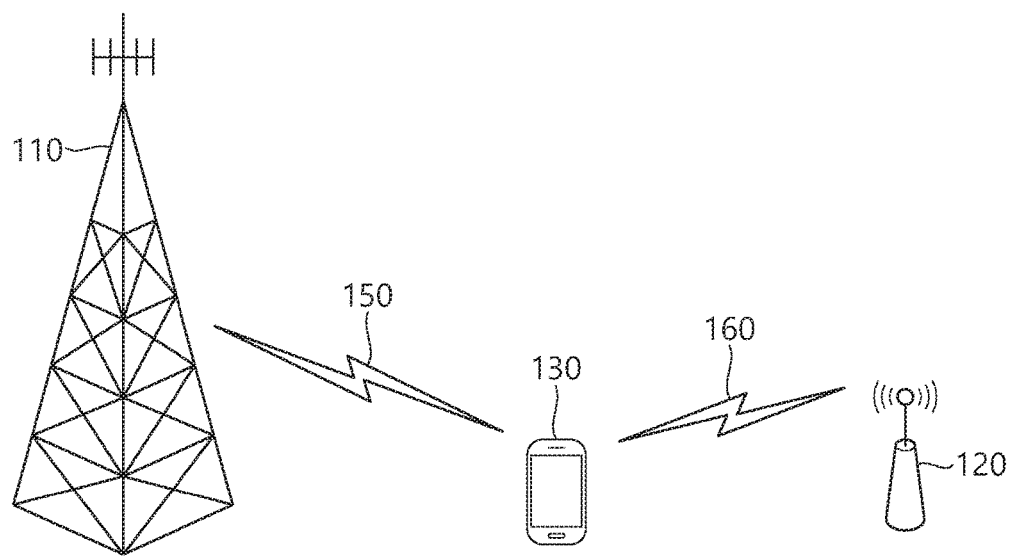
FIG. 1 shows an example of a long term evolution (LTE) service using an unlicensed band.

FIG. 1 shows an example of an LTE service using an unlicensed band.

A wireless device 130 establishes a connection with a $1^{st}$ BS 110, and receives a service through a licensed band. For traffic offloading, the wireless device 130 may receive a service through an unlicensed band with respect to a $2^{nd}$ BS 120.

The $1^{st}$ BS 110 is a BS supporting an LTE system, whereas the $2^{nd}$ BS 120 may also support other communication protocols such as a wireless local area network (WLAN) in addition to LTE. The $1^{st}$ BS 110 and the $2^{nd}$ BS 120 may be associated with a carrier aggregation (CA) environment, and a specific cell of the $1^{st}$ BS 110 may be a primary cell. Alternatively, the $1^{st}$ BS 110 and the $2^{nd}$ BS 120 may be associated with a dual connectivity environment, and a specific cell of the $1^{st}$ BS 110 may be a primary cell. In general, the $1^{st}$ BS 110 having the primary cell has wider coverage than the $2^{nd}$ BS 120. The $1^{st}$ BS 110 may be called a macro cell. The $2^{nd}$ BS 120 may be called a small cell, a femto cell, or a micro cell. The $1^{st}$ BS 110 may operate the primary cell and zero or more secondary cells. The $2^{nd}$ BS 120 may operate one or more secondary cells. The secondary cell may be activated/deactivated by an indication of the primary cell.

The above description is for exemplary purposes only. The $1^{st}$ BS 110 may correspond to the primary cell, and the $2^{nd}$ BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a $1^{st}$ communication protocol and a $2^{nd}$ communication protocol are used in the unlicensed band. ABS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

A cell operating in an unlicensed band is referred to as 'unlicensed cell' and a cell operating in a licensed band is referred to as 'licensed cell'. For clarity, it is assumed that a licensed cell is a primary cell and an unlicensed cell is a secondary cell.

In general, if it is confirmed that a channel is busy, the communication node in the unlicensed band attempts the channel access again after a backoff time expires. Therefore, if backoff is repeated, a great delay may occur when the communication node transmits buffered data.

Further, when a timing at which data transmission starts is limited to an orthogonal division frequency multiplexing (OFDM) symbol boundary or a subframe boundary, between a time at which a communication node attempting transmission identifies a CCA idle and a data transmission start time, another communication node may start signal transmission in advance. To avoid this, the communication node which has identified the CCA idle may transmit a reservation signal for occupying a channel until a data transmission start time.

Figure 2:
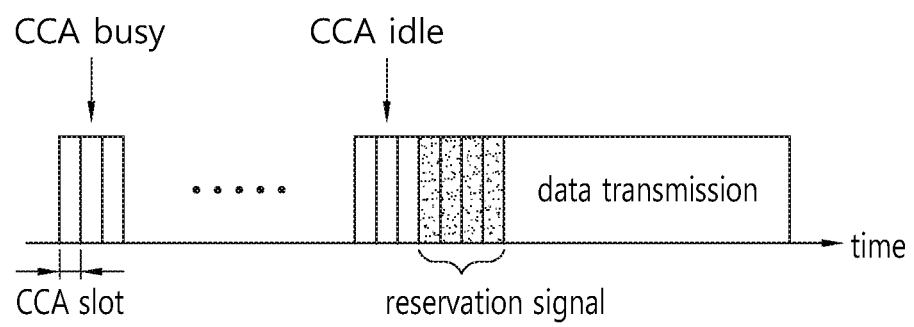
FIG. 2 shows an example of reservation signal transmission.

FIG. 2 shows an example of reservation signal transmission.

A CCA slot is a basic time unit for performing CCA. When a wireless medium is idle during one or more consecutive CCA slots, a communication node may determine that a channel access is possible. Herein, when the wireless medium is idle during 3 CCA slots, a reservation signal is transmitted to occupy the channel.

The reservation signal may be transmitted during one or more consecutive reservation slots. The reservation slot is a time unit by which the reservation signal is transmitted, and may be equal to or less than the CCA slot.

While the reservation signal is transmitted, another communication node needs to detect a specific level of energy in a corresponding CCA slot so that occupancy of the wireless channel is stably guaranteed. Therefore, the reservation signal may be transmitted in such a manner that unit signals to be transmitted during a time duration equal to or less than the CCA slot are transmitted continuously.

The reservation signal may be used not only for the purpose of channel occupancy but also for time/frequency synchronization, automatic gain control (AGC) gain adjustment, or the like in a receiver, and may include information such as a cell ID, a UE ID, or the like.

Assume that a length of a CCA slot is X, a length of a reservation slot is Y, and a length of an OFDM symbol is Z. Herein, Y<=X. One unit signal is transmitted in one reservation slot. When it is said that the reservation signal is transmitted, it may imply that a plurality of unit signals are repetitively transmitted in a plurality of consecutive reservation slots. Alternatively, each of the plurality of unit signals may be transmitted by being multiplied by a different complex signal in every reservation slot. Alternatively, each of the plurality of unit signals may be cyclically shifted in every reservation slot.

Figure 3:
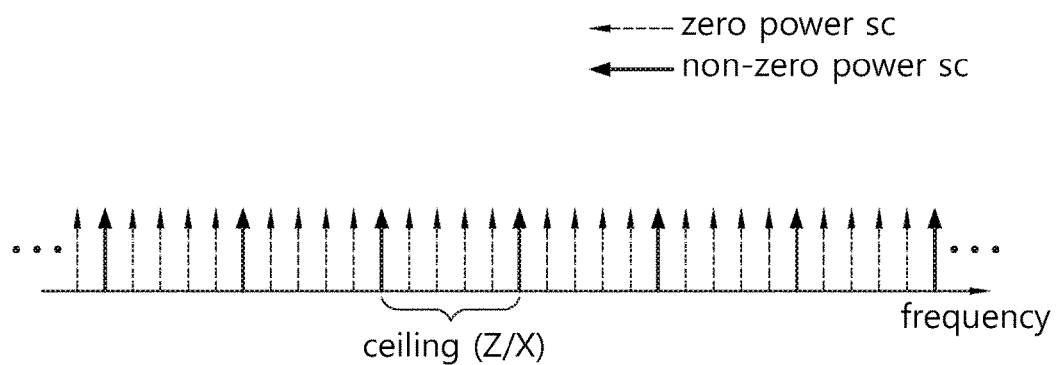
FIG. 3 shows a structure of a reservation signal according to an embodiment of the present invention.

FIG. 3 shows a structure of a reservation signal according to an embodiment of the present invention.

An example of configuring a reservation signal in a frequency domain is shown. To satisfy the relation of Y<=X, the reservation signal is constructed of a signal transmitted through subcarriers spaced by at least N subcarriers, where N satisfies a function of ceiling(Z/X), in the frequency domain. Ceiling(x) returns a smallest integer greater than or equal to x. Accordingly, a signal to be obtained in a time domain has a form in which a signal shorter than X is repeated.

When ceiling(Z/X)=4, the reservation signal may be represented in a form of a frequency-domain sequence such as { . . . , r(n), 0, 0, 0, 0, r(n+1), 0, 0, 0, 0, r(n+2), . . . }. The frequency-domain sequence is subjected to inverse fast Fourier transform (IFFT), and is transmitted by being converted to a time-domain sequence.

Assume that the CCA slot includes a carrier sensing duration of 4 us and an RX-TX switching duration of 5 us, and thus is defined as 9 us. The transmission of the reservation signal may be implemented as continuous transmission of a unit signal with a length of Y<=4 us. Only a portion of the unit signal may be transmitted at a transmission start time or a transmission end time.

The reservation signal transmitted by a UE may be designed to have a single carrier characteristic to utilize transmit (TX) power of the UE to the maximum extent possible.

In one embodiment, the reservation signal may be generated based on a demodulation reference signal (DM RS) used in a UL channel. A DM RS used in a physical uplink control channel (PUCCH) and a physical uplink shared channel (PUSCH) as a UL channel of 3GPP LTE is disclosed in the section 5.5 of 3GPP TS 36.211 V10.5.0 (2012 June). A DM-RS structure used in a 3GPP LTE system may be reused as the reservation signal.

A cyclic shift (CS) or an orthogonal cover code (OCC) may not be applied to the existing DM RS, or the CS or the OCC may be fixed to a specific value. The DM-RS may be transmitted as the reservation signal in a form of being repeated in a time domain.

Figure 4:
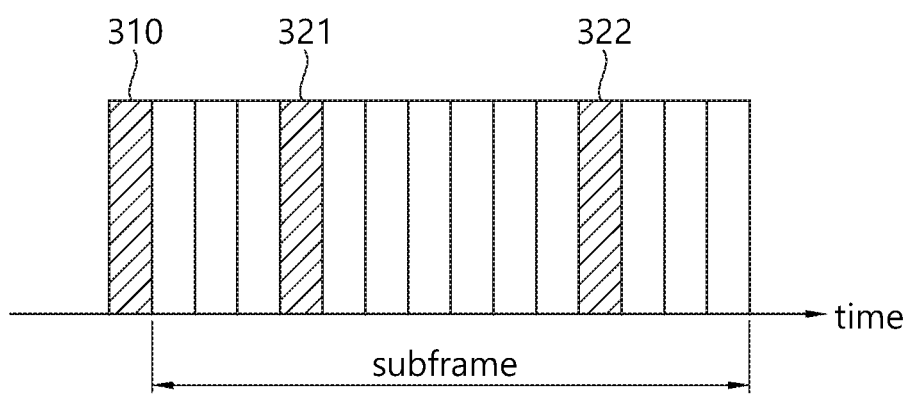
FIG. 4 shows an example of reservation signal transmission.

FIG. 4 shows an example of reservation signal transmission.

A PUSCH is transmitted in one subframe. When one subframe includes 14 OFDM symbols, DM RSs 321 and 322 are transmitted in $4^{th}$ and $11^{th}$ OFDM symbols. A reservation signal 310 may use the same sequence as the DM RS used in a PUCCH or PUSCH immediately subsequent thereto.

In another embodiment, the reservation signal may be generated based on a sounding reference signal (SRS) of 3GPP LTE. A BS may inform a UE of an SRS configuration (SRS bandwidth, cyclic shift, etc.) to be used as the reservation signal. Alternatively, if the SRS configuration is predetermined, it may be designated that the configuration is also applied to transmission of the reservation signal.

In another embodiment, single carrier-frequency division multiple access (SC-FDMA) modulation may be applied to the reservation signal. A pseudo random sequence (PRS) having a length corresponding to a bandwidth required for channel occupancy is generated as a sequence for the reservation signal, and the SC-FDMA modulation may be applied. For example, fast Fourier transform (FFT) may be applied to the PRS, followed by mapping to a subcarrier, and thereafter IFFT may be applied again. A cell ID or a UE ID may be used as a seed for generating the PRS.

In order to reduce a length of a reservation slot in which the reservation signal is transmitted, a subcarrier interval may be set to be great. The subcarrier interval may be greater than 15 kHz.

The reservation signal may not include a cyclic prefix (CP).

Meanwhile, in order for a communication node to occupy a channel by using the reservation signal, it is necessary that coverage of the reservation signal is equal to coverage of a data signal or is sufficiently great, thereby preventing a channel access of another communication node. A physical downlink shared channel (PDSCH) as a DL data channel and a PUSCH as a UL data channel may have different TX power according to a TX bandwidth, a presence/absence of RS transmission per OFDM symbol, and/or each subframe.

Data transmission subsequent to transmission of the reservation signal is defined as a data burst. One data burst may be transmitted in one or a plurality of OFDM symbols or may be transmitted in one or more subframes. In the data burst, TX power may be determined for each OFDM symbol or each subframe.

The TX power of the reservation signal may be adjusted as follows.

In a first embodiment, the TX power of the reservation signal may be set to be equal to or greater than maximum TX power of a plurality of OFDM symbols or a plurality of subframes in the data burst.

In a second embodiment, the TX power of the reservation signal may be set to be equal to or greater than TX power in a subframe corresponding to a greatest TX bandwidth in the data burst.

In a third embodiment, the TX power of the reservation signal may be set to be equal to or greater than TX power of a cell specific reference signal (CRS). Coverage of the reservation signal may be set to a coverage reference of the CRS, and the TX power of the reservation signal may be determined based on the TX power of the CRS. The TX power of the reservation signal may be set to be equal to or greater than the TX power of the CRS transmitted through a full system band. Alternatively, the TX power of the reservation signal may be set to be equal to the total TX power when the TX power of the CRS per resource element (RE) is transmitted through all the REs in the full system band.

In a fourth embodiment, the TX power of the reservation signal may be set to be equal to or greater than a value obtained by adding an offset to the greatest TX power in the data burst. Alternatively, the TX power of the reservation signal may be set to be equal to or greater than a value obtained by adding an offset to average TX power in the data burst. The BS may inform the UE of the offset through a UL grant or RRC signaling. An offset for a DL signal transmitted by the BS may also be reported to the UE. Since the offset to be applied to the TX power of the reservation signal is informed in advance, it may be utilized for AGC gain adjustment or signal detection for a data burst transmitted after the reservation signal received by the UE.

In a fifth embodiment, in case of UL transmission, the TX power of the reservation signal may be defined as TX power of the data burst, TX power of the DM RS in the data burst, or an offset thereof. When the TX power of the data burst is defined as a sum of a first offset given by RRC signaling and a second offset to be subjected to power control, the TX power of the reservation signal may be defined by using a sum of the second offset and a third offset which is set for the reservation signal.

In a sixth embodiment, in case of UL transmission, the TX power of the reservation signal may be defined as a fixed value or a value in proportion to a TX bandwidth of the reservation signal. Information regarding the fixed value or the value in proportion to the TX bandwidth may be delivered by the BS to the UE through RRC signaling or the like.

In general, in order to prevent other communication nodes attempting to access a channel through a CCA from transmitting signals in consistent coverage regardless of whether the reservation signal is transmitted, it is preferable that a change of TX power in one transmission burst is not great. The transmission burst includes the reservation signal and the data burst. A difference of the TX power in the transmission burst may be limited to be less than a specific value. When the difference of the TX power exceeds the specific value, the TX power in the transmission burst may be adjusted to be less than the specified value.

Now, the TX bandwidth of the reservation signal is proposed.

When a communication node occupies a channel by using the reservation signal, the TX bandwidth of the reservation signal may be equal to or greater than the TX bandwidth of the data burst in order to prevent the channel access by another communication node.

If the bandwidth of the data burst changes, the TX bandwidth of the reservation signal may be set to be equal to a maximum bandwidth. The data burst may include a PDSCH or a PUSCH, but may not always include a signal (e.g., CRS) transmitted at a full bandwidth.

The TX bandwidth of the reservation signal may be set based on a specific RS. The reservation signal may be transmitted in a band in which the RS is transmitted.

The reservation signal may be transmitted in a designated band or a designated bandwidth regardless of the transmission of the data burst. This is to always satisfy constant coverage. The reservation signal may be transmitted at the entirety or part of the system bandwidth.

Figure 5:
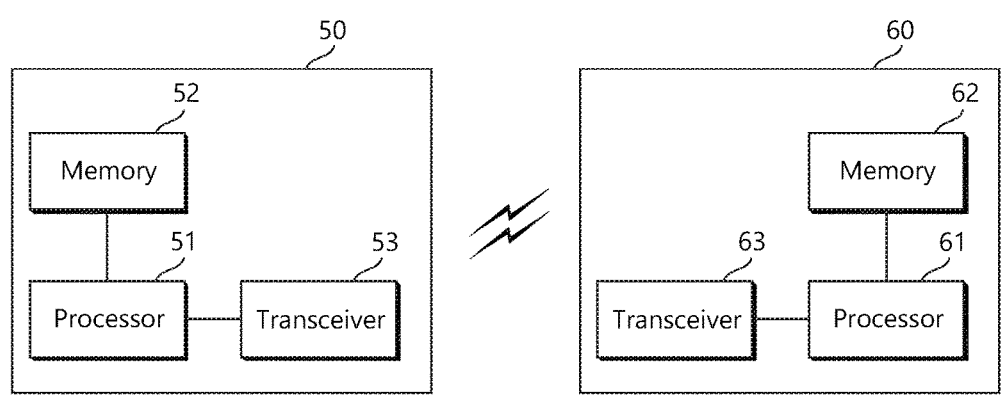
FIG. 5 is a block diagram showing a wireless communication system according to an embodiment of the present invention.

FIG. 5 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

ABS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting data in an unlicensed band, the method comprising:
   determining, by a wireless device, whether a wireless medium is idle by performing a clear channel assessment (CCA) during a plurality of consecutive CCA slots in the unlicensed band; and
   when the wireless medium is idle, transmitting, by the wireless device, a reservation signal to occupy the wireless medium during a plurality of consecutive reservation slots; and
   transmitting, by the wireless device, a data burst over a plurality of orthogonal division frequency multiplexing (OFDM) symbols after transmitting the reservation signal,
   wherein a length of one reservation slot is equal to or less than a length of one CCA slot,
   wherein a reference signal used to demodulate the data burst is transmitted over at least one of the plurality of OFDM symbols,
   wherein the reservation signal includes a plurality of unit signals, each unit signal being transmitted in a corresponding reservation slot, and
   wherein each unit signal includes a sequence generated based on the reference signal and is cyclically shifted in every reservation slot.

2. The method of claim 1, wherein the reservation signal is transmitted through a plurality of subcarriers in frequency domain, the plurality of subcarriers being selected from subcarriers in each reservation slot based on the length of one CCA slot and the length of one OFDM symbol.

3. The method of claim 1, wherein a transmit (TX) power of the reservation signal is equal to or greater than TX power of the data burst.

4. The method of claim 1, wherein a TX bandwidth of the reservation signal is equal to or greater than a TX bandwidth of the data burst.

5. A device for transmitting data in an unlicensed band, the device comprising:
- a transceiver configured to transmit and receive a radio signal; and
- a processor coupled to the transceiver and configured to:
  - determine whether a wireless medium is idle by performing a clear channel assessment (CCA) during a plurality of consecutive CCA slots in the unlicensed band;
  - transmit a reservation signal to occupy the wireless medium during a plurality of consecutive reservation slots; and
  - transmit a data burst over a plurality of orthogonal division frequency multiplexing (OFDM) symbols after transmitting the reservation signal,
- wherein a length of one reservation slot is equal to or less than a length of one CCA slot,
- wherein a reference signal used to demodulate the data burst is transmitted over at least one of the plurality of OFDM symbols,
- wherein the reservation signal includes a plurality of unit signals, each unit being transmitted in a corresponding reservation slot, and
- wherein each unit signal includes a sequence generated based on the reference signal and is cyclically shifted in every reservation slot.

6. The device of claim 5, wherein the reservation signal is transmitted through a plurality of subcarriers in frequency domain, the plurality of subcarriers being selected from subcarriers in each reservation slot based on the length of one CCA slot and the length of one OFDM symbol.

* * * * *